United States Patent
Roess et al.

[11] Patent Number: 6,092,332
[45] Date of Patent: Jul. 25, 2000

[54] METHOD FOR CULTIVATING AND REARING ORNAMENTAL PLANTS OR TREELIKE PLANTS AS POTTED PLANTS AND A PLANTING SYSTEM

[75] Inventors: Thomas Roess; Bernhard Blome, both of Twistringen, Germany

[73] Assignee: Twistringer RMB Dranfilter GmbH & Co. KG, Germany

[21] Appl. No.: 08/943,243

[22] Filed: Oct. 3, 1997

[30] Foreign Application Priority Data

Oct. 4, 1996 [DE] Germany ............ 296 17 312 U

[51] Int. Cl.[7] ............................................... A01G 9/02
[52] U.S. Cl. ........................... 47/83; 47/66.7; 47/87; 47/47
[58] Field of Search ............... 47/47, 48.5, 65.5, 47/65.6, 66.1, 66.6, 66.7, 67, 77, 83, 87

[56] References Cited

U.S. PATENT DOCUMENTS

| | | | |
|---|---|---|---|
| 197,406 | 11/1877 | Reinecke | 47/83 |
| 262,335 | 8/1882 | Wagner | 47/83 |
| 603,492 | 5/1898 | Waterer | 47/65.6 |
| 1,740,057 | 12/1929 | Babich | 47/83 |
| 2,900,759 | 10/1959 | Hutchinson | 47/66.1 |
| 3,188,771 | 6/1965 | Ballai | 47/47 |
| 3,334,440 | 8/1967 | Choquette | 47/67 |
| 3,685,204 | 8/1972 | O'Harra | 47/47 |
| 4,112,619 | 9/1978 | Morsani et al. | 47/66.1 |
| 4,571,883 | 2/1986 | Shaw | 47/65.6 |
| 4,779,378 | 10/1988 | Mason, Jr. | 47/83 |
| 4,825,592 | 5/1989 | Earls | 47/82 |
| 5,018,300 | 5/1991 | Chiu et al. | 47/67 |
| 5,031,356 | 7/1991 | Thomsen | 47/47 |
| 5,172,517 | 12/1992 | Thomsen | 47/83 |
| 5,201,860 | 4/1993 | Richardson | 47/39 |
| 5,333,409 | 8/1994 | Mendes | 47/67 |
| 5,345,714 | 9/1994 | Washington | 47/70 |
| 5,381,625 | 1/1995 | Wente | 47/83 |
| 5,448,854 | 9/1995 | Hirsch et al. | 47/65.6 |
| 5,450,691 | 9/1995 | Christis et al. | 47/83 |
| 5,577,344 | 11/1996 | Zaremba et al. | 47/39 |

FOREIGN PATENT DOCUMENTS

| | | | |
|---|---|---|---|
| 23956 | 7/1925 | Australia | 47/83 |
| 0 530 080 | 8/1992 | European Pat. Off. . | |
| 530080 | 3/1993 | European Pat. Off. | 47/83 |
| 84938 | 3/1965 | France | 47/83 |
| 26 86 217 | 1/1992 | France . | |
| GM 17 60 423 | of 0000 | Germany . | |
| 2540038 | 3/1977 | Germany | 47/83 |
| 27 44 143 | 4/1979 | Germany . | |
| 120880 | 8/1980 | Germany | 47/83 |
| 37 30 666 | 3/1988 | Germany . | |
| 39 11 973 | 1/1990 | Germany . | |
| 39 23 796 | 2/1990 | Germany . | |
| 42 15 401 | 5/1992 | Germany . | |
| 4401121 | 7/1994 | Germany | 47/83 |
| 94 12 433 | 2/1995 | Germany . | |
| 195 16 572 | 11/1996 | Germany . | |
| 404197111A | 7/1992 | Japan | 47/83 |
| 7-274737 | 10/1995 | Japan . | |
| 22 76 802 | of 0000 | United Kingdom . | |
| 2204785 | 11/1988 | United Kingdom | 47/83 |

*Primary Examiner*—Michael J. Carone
*Assistant Examiner*—Fredrick T. French, III
*Attorney, Agent, or Firm*—Vidas, Arrett & Steinkraus

[57] ABSTRACT

A method for cultivating and rearing ornamental plants and treelike plants as potted plants with the following method steps:

- a tube covered with opaque, heat-insulating insulating material with a funnel-shaped or shell-shaped enlargement at the upper end is placed upright into a pot;
- the enlargement, tube and pot are then filled with a substrate; and
- into the substrate of the enlargement a cutting or seeds are inserted.

20 Claims, 6 Drawing Sheets

METHOD FOR CULTIVATING AND REARING ORNAMENTAL PLANTS OR TREELIKE PLANTS AS POTTED PLANTS AND A PLANTING SYSTEM

BACKGROUND OF THE INVENTION

The invention relates to a method for cultivating and rearing potted plants and a planting system for this.

It is known to rear ornamental plants and treelike plants in pots. The more or less larger pots of plastic material, clay or likewise are filled with a suitable substrate before a cutting, seed or bulb is inserted.

Many ornamental plants and also various treelike plants are reared with the so-called high stem culture. This requires a constant pruning of the side growths so that the growth energy is directed to the main growth. This method of rearing is protracted and entails much energy expenditure.

From DE 37 30 666 and U.S. Pat. No. 5,031,351 it is known to insert plant tubes into the substrate filled in a plant pot. The tube is likewise partly provided with a substrate in the lower region for receiving the seed or a cutting. The plant tube has the job of laterally supporting the high growing plant and to give it a shape which it would not assume without such a tube.

From DE 27 44 143 there is known a method for cultivating plants and a container for carrying out the method with which a seed or a cutting is inserted into a container provided with holes. The container with the sprouting plant is applied into or on the ground, wherein the roots grow out of the holes of the container into the surrounding substrate.

From DE 42 15 401 there is known a device for rearing and keeping plants with a low or lacking ability to stand on their own. The device consists essentially of a tubular hollow body which is inserted into a plant pot which at its upper end is open and comprises lateral openings at the upper end. A cutting is arranged at the height of the substrate in the plant pot within the hollow body so that it must grow upwards within the hollow body. The roots may grow into the substrate in the plant pot via lateral openings in the lower region of the hollow body.

From U.S. Pat. No. 3,334,440 it is known to arrange a tube in a plant pot which is provided with lateral openings. The tube is closed at its lower end and above is provided with a funnel-shaped part. The tube and funnel-shaped part are surrounded by a permeable material for example moss. Water is filled into the tube. By way of this the atmosphere around the tube is supposed to be supplied with damp air and the plants externally creeping upwards on the tube are moistened.

From U.S. Pat. No. 3,188,771 it is known to place a tube into a pot. The tube is filled with a substrate and serves for holding a creeping plant from which aerial roots may grow into the inside of the tube via openings.

BRIEF SUMMARY OF THE INVENTION

It is the object of the invention to provide a plant system with which a time reduction for the culture is maintained with at the same time an optical effect of a high stem culture.

This object is achieved by the features of claim 1.

With the invention on the one hand a conventional pot filled with substrate is employed, this pot being formed of any material and in any shape. Its size depends on the expected root formation of the plant. Furthermore the invention envisages a tube of relatively rigid material, for example metal, plastic or wood which is inserted into the substrate in the pot, wherein the lower end however maintains a distance to the floor or laterally comprises passages. The tube is likewise filled with a substrate. It is open at the lower and upper end. A cutting is inserted into the upper end of the tube into the substrate. It may also be one or more seeds. The forming root strands penetrate the substrate layer within the tube and branch out in the plant pot after the exit at the lower end of the tube in order to form an interweaving. With this the speed of the rooting-through is very high. Within a very short time a plant arrangement corresponding to a high-stem plant may be achieved with an effort which is significantly lower than for conventional high stem cultures.

The tube instead of having to be specially manufactured may also be of bamboo tube. Preferably the tube is straight in order to produce the typical look of a high-stem plant. According to one formation of the invention the tube may however be bent between the ends into any shape, in the case that particular optical effects are to be achieved.

According to a further formation of the invention the tube at the upper end may comprise an enlargement which is preferably shell-shaped or funnel-shaped. In this way the surface area is increased and several cuttings at once may be inserted. For this a separate part may be employed which by way of a tube connecting piece is preferably applied into the tube with an interference fit.

According to another formation of the invention the tube may comprise branching off connection pieces between the ends which point obliquely upwards. Into the branchings, cuttings may likewise be inserted whose roots then grow through downwards via the branchings and the tube.

According to another formation of the invention the tube is surrounded with a layer of opaque, insulating material, preferably fiber material, for example coconut fibers. The material can improve the looks of the tube and further has the advantage that it protects the root strands from excessive heat and light irradiation. The material may be fastened by the wrapping around of a thread, for example a crosswinding. Alternatively the material may be fastened onto the tube by adhesing.

The manufacture of the tube is extraordinarily simple. It may be produced in larger lengths and cut to length. If a covering with a fiber material is provided the covering is usefully effected subsequent to the tube production. Only afterwards are the individual tube pieces cut from the line.

In a further formation of the invention it is provided that the tube at the lower end is provided with lateral holes. The holes are located within the substrate in the plant pot. In this way the root strands can laterally work themselves out of the tube into the pot, this proceeding quickly and thus leads to a faster rooting in the pot.

In a further formation of the invention it is provided that the plant pot at the inner side comprises a layer of fiber material, for example of coconut fibers. Before filling with the substrate, a mat-shaped layer of coconut fibers may be inserted. This measure has the advantage that a connection between the root interweaving and the fiber layer takes place, by which means the tube is given an increased stability.

It is conceivable to insert the tube into the substrate without it being secured laterally or downwardly. A distance to the floor of the plant pot should be available. It is however to be preferred for the tube to be supported via a suitable foot arrangement on the floor of the pot. This foot arrangement must have lateral passages for the roots so that they may branch into the substrate of the plant pot. In a further formation of the invention it is provided that the foot is a separate part which is inserted from below into the tube. Alternatively according to another formation of the invention, connected to the end of the tube there may be a ring or likewise, on which stiltlike feet are mounted.

In order to improve the stability of the planting system in the pot, according to one formation of the invention it may be provided for a radial enlargement to be provided at the lower end of the foot, this enlargement for example being formed as a radial flange. The enlargement permits a rigid standing in the pot, also when the foot is applied onto a substrate located in the pot. With this the substrate layer arranged over the flange, by way of its load, ensures the standing security of the foot and thus of the tube. The foot consists preferably of a foot body, of which stiltlike sections exit downwards. The upper part is formed as a connection piece which may be inserted into the tube. Preferably an annular or flange-annulus shaped body is connected to the outsides of the stilt sections, preferably by welding. The annular or flange-annulus shaped ring is preferably U-shaped in cross section. The ring in its web region has at least one hole so that no fluid may collect in this region

BRIEF DESCRIPTION OF THE DRAWINGS

The invention is hereinafter described in more detail by way of the drawings.

DETAILED DESCRIPTION OF THE INVENTION

Figure 1:
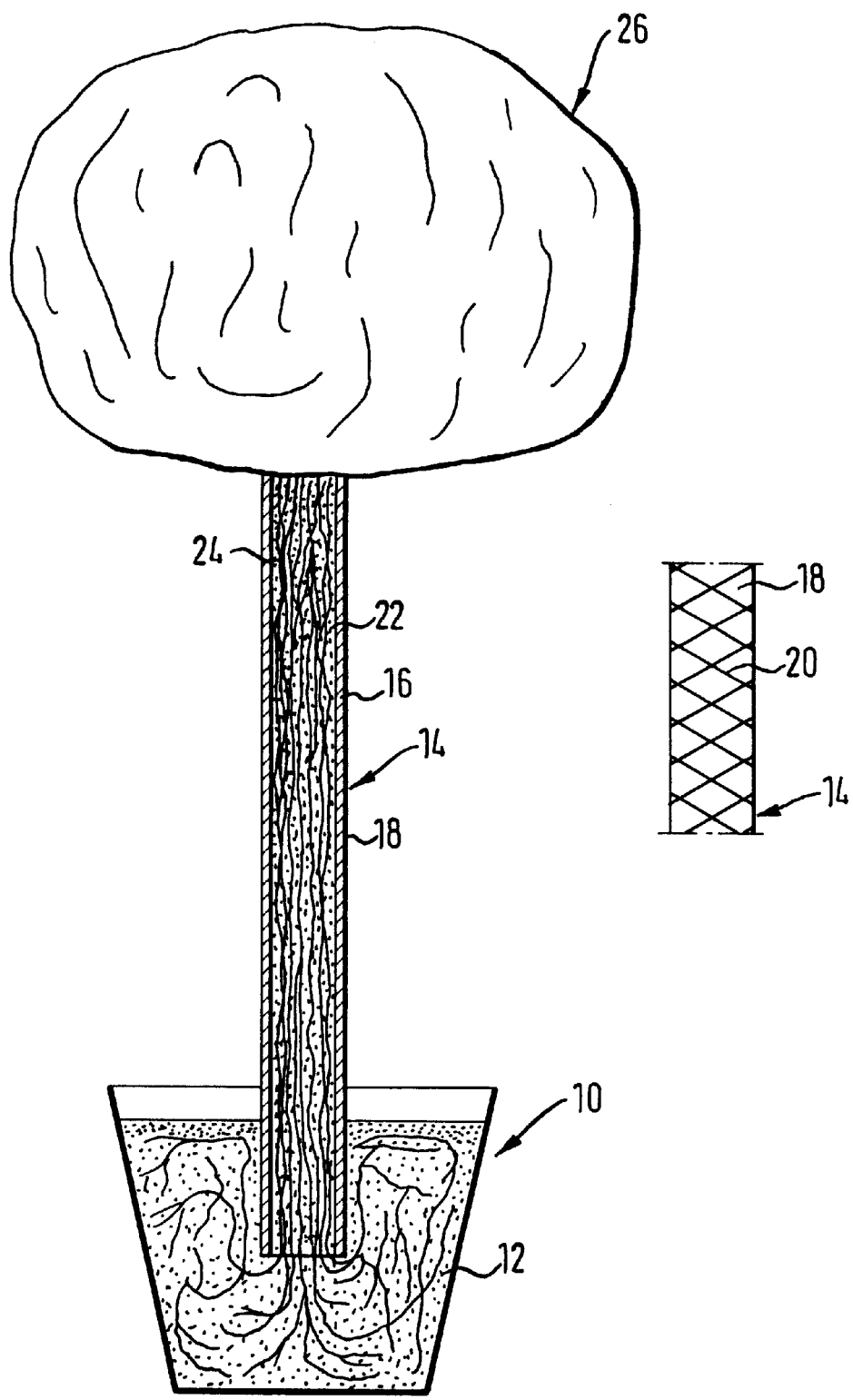
FIG. 1 shows partly in section a first embodiment form of a planting system according to the invention.

In FIG. 1 in section, there is shown a usual conical plant pot 10 which is filled with a substrate 12. From above an insertion tube 14 is introduced into the pot 10 at a distance to the floor of the pot 10. The insertion tube 14 consists of a tube section 16 of relatively rigid material, for example of plastic, metal, wood or likewise, which is covered over with a layer of fiber material 18. The fiber material 18 may be adhered on or fastened with the help of a thread. Such a fastening manner can be deduced from the representation on the right in FIG. 1 which shows a crosswinding 20.

Also the tube is filled up to the upper end with a substrate 22.

At the upper end of the covering tube 14 a cutting is planted into the substrate 22. Root strands 24 penetrate through the substrate layer 22 and grow out of the lower end of the insertion tube 14 into the substrate of the pot. By way of the root formation in the pot 10 also the insertion tube 14 is anchored more strongly in the interweaving so that it can better support the forming plant 26.

The nutrients and water supply is unproblematical. A direct taking up is effected through the root strands in the pot 10 so that a direct supply to the plant 26 takes place.

Figure 2:
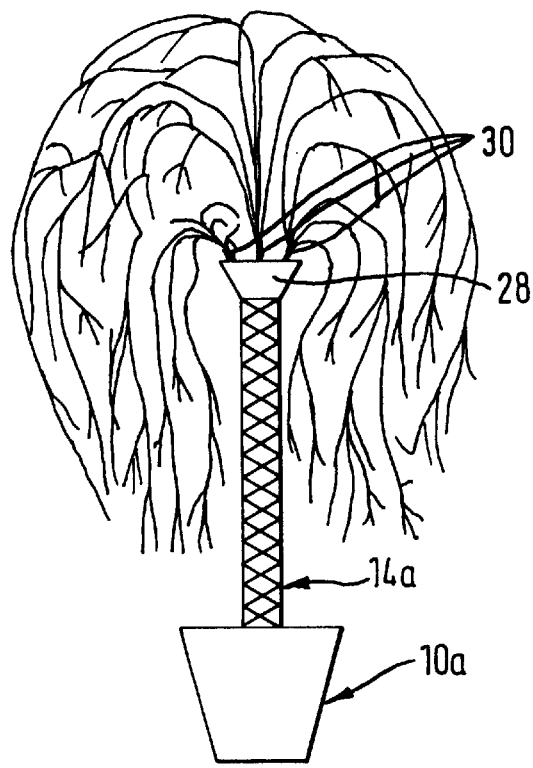
FIG. 2 shows a second embodiment form of the planting system according to the invention.

With the embodiment form according to FIG. 2 an insertion tube 14a is inserted in a pot 10a, this tube being enlarged funnel-shaped at the upper end 28. The funnel 28 may be formed as one piece with the tube or stuck on as a separate part. On account of the enlargement 28 several cuttings may be implanted, as is indicated at 30.

Figure 3:
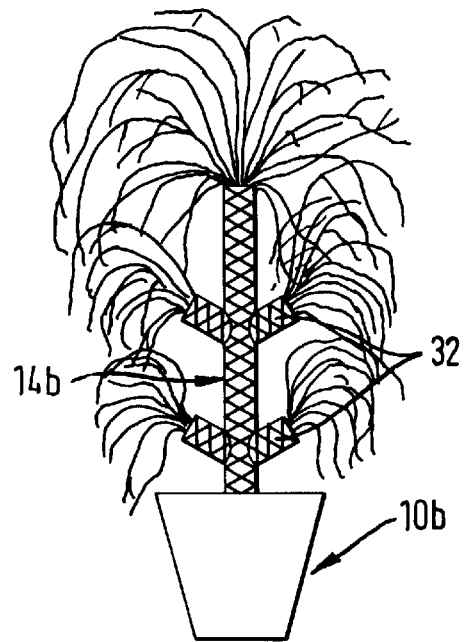
FIG. 3 shows a third embodiment form of the planting system according to the invention.

With the embodiment form according to FIG. 3 an insertion tube 14b is inserted into the plant pot 10b, this tube being basically constructed the same as the insertion tube 14 or 14a according to FIGS. 1 and 2, but further comprises in pairs branching connection pieces 32 which rise obliquely upwards roughly at an angle of 30° to the vertical. The branching sections 32 are likewise filled with substrate and may accommodate cuttings for forming plants, as is shown in FIG. 3.

Figure 4:
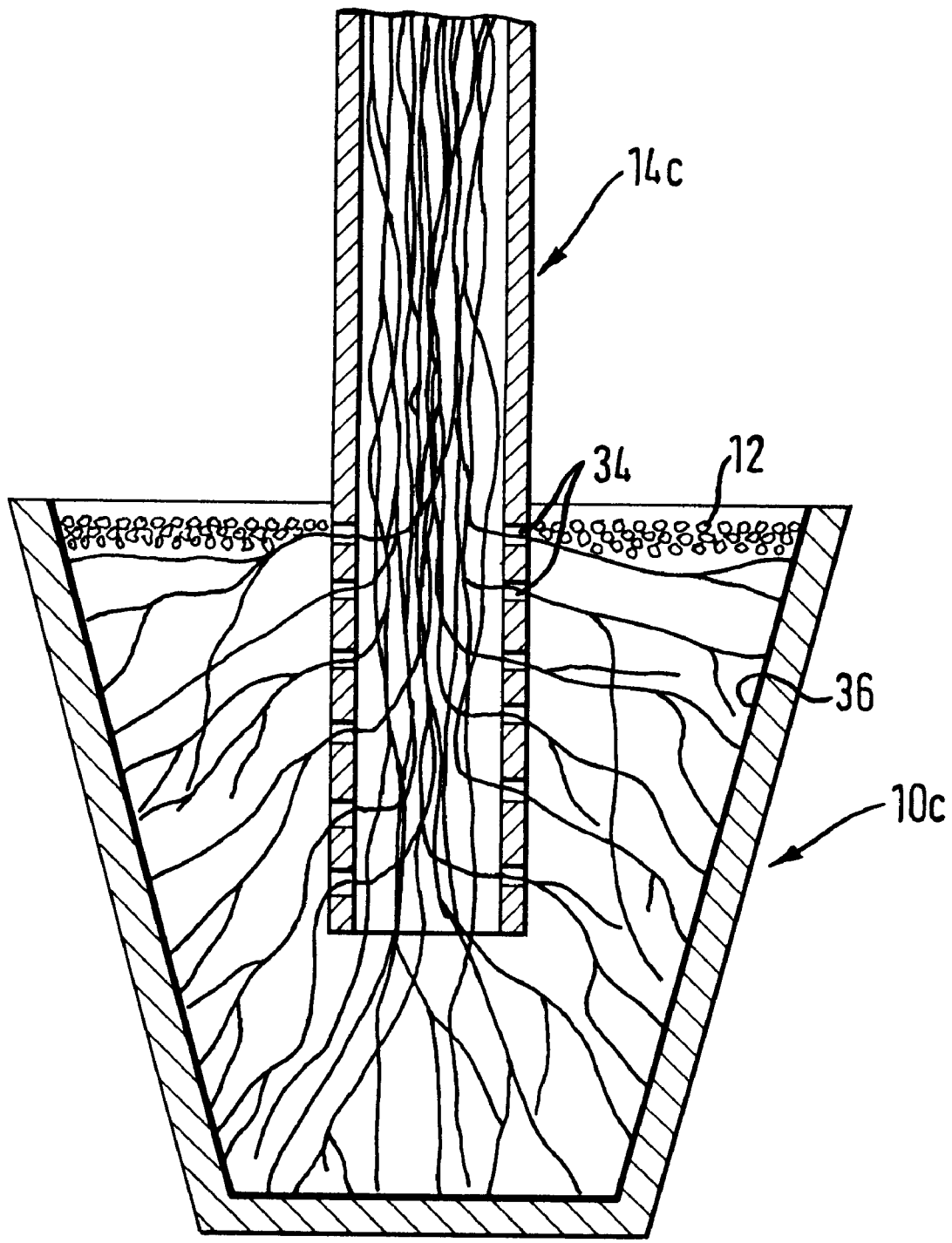
FIG. 4 shows a fourth embodiment form of the planting system according to the invention.

In FIG. 4 a plant tube 14c is inserted with its lower end in the substrate 12 of a plant pot 10c, wherein the inserted end is provided with a row of lateral openings 34 through which the roots my grow into the substrate 12.

The plant pot 10c further has on the inner side a layering 36 of fiber material for example in the form of a mat which is inserted before the filling with the substrate 12. The layering permits the ingrowth of root ends into the layer and thus a consolidation of the roots and thus a better supporting of the tube 14c.

Figure 5:
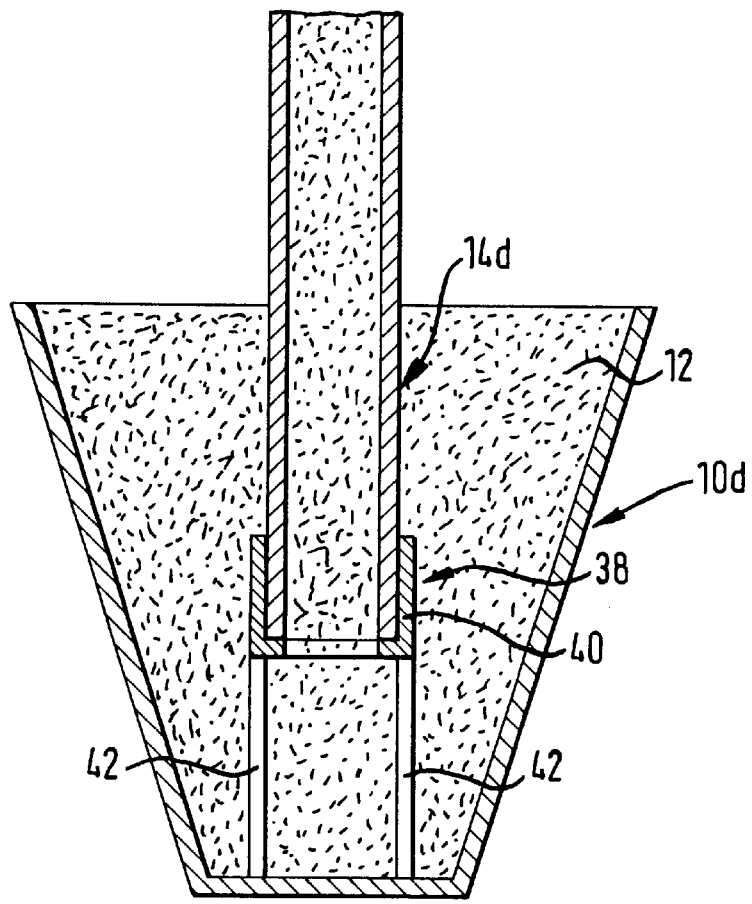
FIG. 5 shows a fifth embodiment form of the planting system according to the invention.
Figure 6:
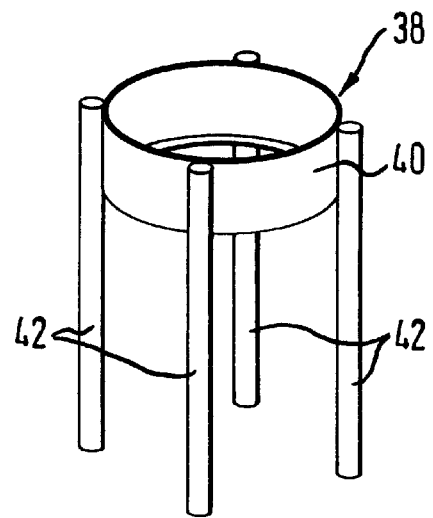
FIG. 6 shows a perspective detail of the planting system according to FIG. 5.

In FIG. 5 a plant tube 14d which is inserted into the substrate 12 of a pot 10d comprises a foot arrangement 38 consisting of a ring 40 which is laid around the lower end of the tube 14d and is axially fixed, and consisting of several stilt feet 42 which are mounted at a circumferential distance for example of 90° on the ring 40. Via the stilt feet 42 the tube 14d is supported on the floor and by way of this permits a secure position of the plant tube 14d without the growing-out of the roots being hindered.

Figure 7:
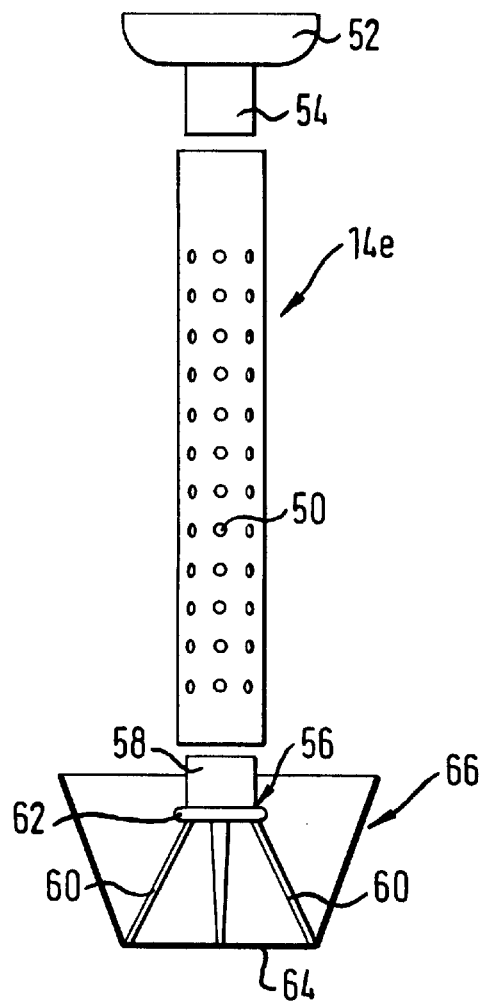
FIG. 7 shows in an disassembled view a further embodiment form of a planting system according to the invention.

In FIG. 7 a tube 14e is shown which is open above and below and which comprises relatively small holes 50 through which the ventilation of the substrate in the tube 14e may be effected. On the tube is placed a shell 52 which on the lower side comprises a tube connecting piece 54 which can be inserted into the tube 14e and can be kept there with an interference fit. The shell 52 serves for receiving one or more cuttings or likewise. It is to be understood that also the shell 52 is at least partly filled up with substrate.

At the lower end of the tube 50 there is provided a foot 56 which consists of a tube section 58 and several foot sections 60 distanced at a circumferential distance which diverge downwards. The tube section 58 is insertable into the tube 14e and kept there by an interference fit. A radial enlargement 62 on the tube section 58 prevents the tube section 58 from being inserted so far. The foot sections 60 are so measured in their angles that they support themselves on the edge region of the floor 64 of the pot 66. By way of this an automatic centering of the tube 50 in the pot 66 is effected. It is to be understood that with such an application feet 56 are to be adapted to the dimensions of pots 66.

Usefully the tube 14e is provided with an opaque and insulating covering in order to protect the root interweaving within the tube against light and heat effects.

Figure 8:
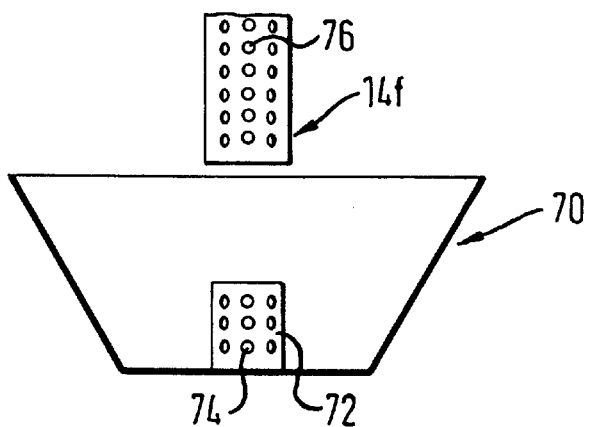
FIG. 8 shows a further embodiment form of a planting system according to the invention.

In FIG. 8 there is shown a plant pot 70 whose floor comprises a tubular projection 72, pointing upwards, with holes 74. The projection 72 is shaped so that a tube 14f, corresponding to the tube 14e in FIG. 7, may be inserted over the projection 72 preferably with friction. In this way the tube 14f is securely kept in the pot 70. The tube 14f has openings in the lower end regions so that via the openings 74 and 76 roots may grow towards the outside into the pot.

FIG. 9 again shows the plant pot as has already been described further above and which is filled with a substrate 12. One furthermore recognises the tube 14d according to FIG. 5 which is wrapped up in a fleece 80 or similar material. The material is heat and light insulating.

Figure 9:
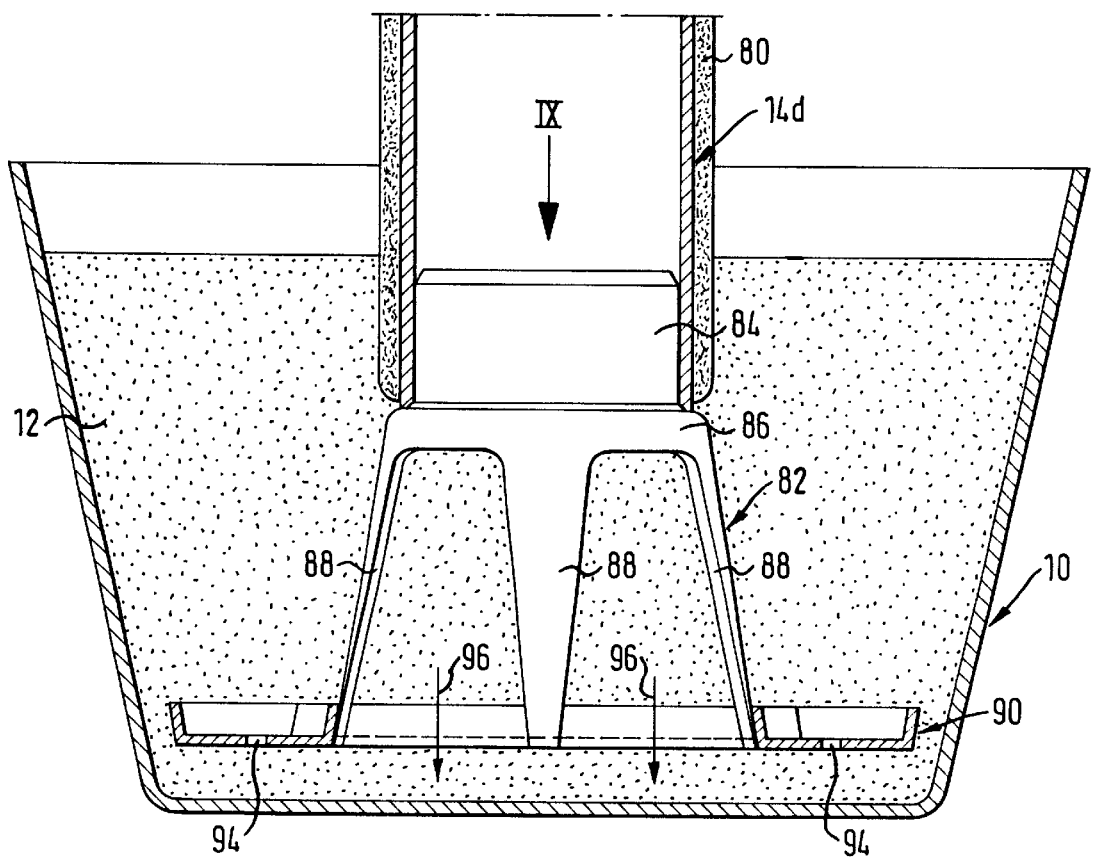
FIG. 9 schematically shows a further embodiment form of a foot for the planting system according to the invention.
Figure 10:
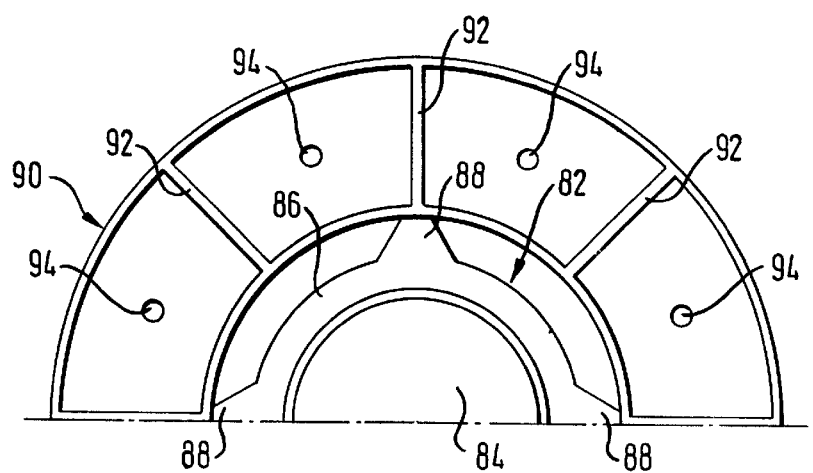
FIG. 10 shows the foot arrangement according to FIG. 9 in a plan view according to arrow 9.

In FIGS. 8 and 9 a particular foot design for the tube 14d is shown. The foot arrangement is as a whole indicated at 82. It comprises a tube connection piece 84 which is inserted into the lower end of the tube 14d, preferably with friction. Below the connection piece 84 the foot arrangement 82 is annularly broadened, as is shown at 86, so that a shoulder is formed on which the lower end of the tube 14d sits. Below the enlargement there are formed four stilts 88 which taper downwardly and which on the outer side are bent circular arc shaped. A flange ring 90 is laid around the stilts 88. The flange ring, as is recognized in FIG. 8 is U-shaped in cross section. The ring is laid around the stilts 88 roughly fitting, but may however be welded to these. The inner space of the flange ring 90 is subdivided by a radial web 92 (FIG. 9). In the compartments, there are provided openings 94, from which water may run out. The foot arrangement of FIG. 9 is shown in a plan view in FIG. 10 according to arrow 9.

One recognises that the foot arrangement 82 by way of the loading of the substrate 12 is given a sufficient stability, even when the foot arrangement is placed on the substrate located in the pot 10. On the one hand however it is also possible to place the ring 90 directly onto the floor of the pot. This is particularly useful with larger pots with particular conditions. The roots of the plants may move laterally between the stilts 88 via the intermediate space, and downwards as is indicated by the arrows 96.

What is claimed is:

1. A planting system comprising:
a pot filled with a substrate, the pot having an interior base, and
a rigid tube filled with a substrate, the rigid tube open only at both ends, surrounded with opaque heat-insulating material and extending upwardly from the interior of pot,
the tube towards the top capable of receiving a plant or a seed,
the tube towards the bottom having at least one opening such that roots growing downward from a seed or plant received in the substrate in the tube and growing through the substrate in the tube may grow into the substrate of the pot,
wherein the tube is supported via a support extending from the bottom of the tube, the support comprising a ring portion with a plurality of feet extending therefrom, the ring portion coaxial with the tube.

2. The planting system of claim 1 wherein the ring portion encircles the bottom of the tube.

3. The planting system of claim 1 wherein the ring portion is inserted into the bottom of the tube.

4. A planting system for cultivating ornamental plants and treelike plants comprising:

a pot filled with a substrate, the pot having an interior base, and a rigid tube likewise filled with a substrate, the rigid tube open at both ends, surrounded with opaque heat-insulating material and extending upwardly from the interior of pot, the tube towards the top having an enlargement with substrate therein for receiving seeds or at least a cutting, the tube towards the bottom open such that roots growing downwards from a seed or cutting received in the substrate of the enlargement and through the substrate in the tube may grow into the substrate of the pot, wherein the tube is supported via a foot arrangement on the base of the pot, the foot arrangement comprising lateral passages.

5. A planting system according to claim 4, wherein at the lower end of the foot there is provided a radial enlargement for increasing the standing security of the tube in the pot.

6. A planting system according to claim 5, wherein the enlargement at the lower end of the foot is formed as a radial flange.

7. A planting system according to claim 6, wherein a separate flange ring is provided which approximately surrounds the foot and is connected thereto.

8. A planting system according to claim 7, wherein the ring has a U-shaped profile in cross-section, the ring having an inner space subdivided by a radial web, and in the web region there is provided at least one opening.

9. A planting system according to claim 4, wherein the tube at the upper end comprises an enlargement.

10. A planting system according to claim 9, wherein the enlargement is a separate part with a hollow tubular projection which can be inserted into the upper end of the tube.

11. A planting system according to claim 2, wherein the material of the tube consists of plastic, metal or wood.

12. A planting system according to claim 4, wherein the tube is straight or is bent into any shape between the ends.

13. A planting system according to claim 4, wherein the tube comprises branching connection pieces between the ends which point obliquely upwards.

14. A planting system according to claim 4, wherein the opaque material is fastened by a wrapped thread.

15. A planting system according to claim 4, wherein the tube comprises several lateral holes at the lower end.

16. A planting system according to claim 4, wherein the plant pot comprises a layer of fiber material on the inner side.

17. A planting system according to claim 4, wherein the foot is provided with a tubular projection which can be inserted into the tube.

18. A planting system according to claim 4, wherein on the floor of the pot there is formed a middle projection onto which the tube can be inserted.

19. A planting system according to claim 4, wherein the foot reaches to the edge of the pot floor.

20. A planting system according to claim 4, wherein the substrate in the tube is a powdery or grainy material which swells up on entry of water.

* * * * *